United States Patent
Kogo et al.

(10) Patent No.: US 9,657,627 B2
(45) Date of Patent: May 23, 2017

(54) ABNORMALITY DIAGNOSIS APPARATUS OF EXHAUST GAS PURIFICATION APPARATUS

(71) Applicant: TOYOTA JIDOSHA KABUSHIKI KAISHA, Toyota-shi, Aichi (JP)

(72) Inventors: Tomoyuki Kogo, Gotenba (JP); Makoto Ogiso, Mishima (JP); Taiga Hagimoto, Nagaizumi-cho (JP); Arifumi Matsumoto, Gotenba (JP); Kazuya Takaoka, Susono (JP); Hirokazu Nishijima, Susono (JP); Kenji Furui, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 14/892,968

(22) PCT Filed: May 29, 2014

(86) PCT No.: PCT/JP2014/064223
§ 371 (c)(1),
(2) Date: Nov. 20, 2015

(87) PCT Pub. No.: WO2014/192850
PCT Pub. Date: Dec. 4, 2014

(65) Prior Publication Data
US 2016/0131003 A1  May 12, 2016

(30) Foreign Application Priority Data

May 30, 2013  (JP) .................................. 2013-113800

(51) Int. Cl.
*F01N 3/20* (2006.01)
*F02M 26/15* (2016.01)
(Continued)

(52) U.S. Cl.
CPC .............. *F01N 3/208* (2013.01); *F01N 11/00* (2013.01); *F01N 11/007* (2013.01);
(Continued)

(58) Field of Classification Search
CPC . Y02T 10/47; F02D 41/1461; F02D 41/0055; F02D 41/0235; F01N 3/208;
(Continued)

(56) References Cited

U.S. PATENT DOCUMENTS

2007/0033924 A1* 2/2007 Enoki ................... F01N 11/007
60/276
2009/0165758 A1* 7/2009 Nishiumi .............. F01N 3/0871
123/568.21
(Continued)

FOREIGN PATENT DOCUMENTS

JP      2009068470 A   *  4/2009
JP      2010-159705        7/2010
WO   WO 2012/164713 A1   12/2012

*Primary Examiner* — Patrick Maines
(74) *Attorney, Agent, or Firm* — Finnegan, Henderson, Farabow, Garrett & Dunner, LLP

(57) ABSTRACT

An abnormality diagnosis apparatus includes an exhaust gas purification apparatus arranged in an exhaust passage of an internal combustion engine and including a SCR catalyst; a supply apparatus supplying an additive such as ammonia to the exhaust gas purification apparatus; an EGR apparatus recirculating a part of exhaust gas from the exhaust passage at a downstream side of a position of supplying the additive to an intake passage; obtaining means for obtaining a $NO_x$ inflow amount into the exhaust gas purification apparatus; diagnosing means for calculating a physical quantity correlated to a $NO_x$ purification performance of the exhaust gas purification apparatus using the obtained $NO_x$ inflow amount, and diagnosing that an abnormality has occurred in the exhaust gas purification apparatus when the physical quantity is smaller than a threshold; and correcting means
(Continued)

for, when the additive is recirculated together with a part of the exhaust gas, correcting the threshold to a smaller value than when otherwise.

5 Claims, 6 Drawing Sheets

(51) Int. Cl.
    *F01N 11/00*     (2006.01)
    *F02D 41/00*     (2006.01)
    *F02D 41/02*     (2006.01)
    *B01D 53/94*     (2006.01)
    *F01N 3/10*     (2006.01)
    *F01N 3/035*     (2006.01)
    *F01N 13/00*     (2010.01)

(52) U.S. Cl.
    CPC ..... *F02D 41/0065* (2013.01); *F02D 41/0235* (2013.01); *F02M 26/15* (2016.02); *B01D 53/9418* (2013.01); *B01D 53/9495* (2013.01); *F01N 3/035* (2013.01); *F01N 3/106* (2013.01); *F01N 3/2066* (2013.01); *F01N 13/009* (2014.06); *F01N 2550/02* (2013.01); *F01N 2560/026* (2013.01); *F01N 2610/02* (2013.01); *F01N 2900/0402* (2013.01); *F01N 2900/1402* (2013.01); *Y02C 20/10* (2013.01); *Y02T 10/24* (2013.01); *Y02T 10/47* (2013.01)

(58) Field of Classification Search
    CPC ............... F01N 11/007; F01N 2550/02; F01N 2610/02; F01N 2900/08; F01N 2900/1402
    USPC .......................... 60/295, 301, 278, 285, 286
    See application file for complete search history.

(56) References Cited

U.S. PATENT DOCUMENTS

| | | | |
|---|---|---|---|
| 2011/0265463 A1 | 11/2011 | Kojima et al. | |
| 2012/0124973 A1* | 5/2012 | Lee ................... | F02D 41/0072 60/287 |
| 2014/0130483 A1* | 5/2014 | Miyake ................ | F02M 26/47 60/285 |
| 2014/0360163 A1* | 12/2014 | Kurtz ................. | F02D 41/0052 60/274 |
| 2016/0115851 A1* | 4/2016 | Kogo ................... | F01N 3/2066 60/276 |
| 2016/0131003 A1* | 5/2016 | Kogo ..................... | F01N 11/00 60/276 |

* cited by examiner

ABNORMALITY DIAGNOSIS APPARATUS OF EXHAUST GAS PURIFICATION APPARATUS

CROSS-REFERENCE TO RELATED APPLICATIONS

This application is a national phase application of International Application No. PCT/JP2014/064223, filed May 29, 2014, and claims the priority of Japanese Application No. 2013-113800, filed May 30, 2013, the content of both of which is incorporated herein by reference.

TECHNICAL FIELD

The present invention relates to an abnormality diagnosis technique for an exhaust gas purification apparatus provided in an exhaust passage of an internal combustion engine.

BACKGROUND ART

Patent Document 1 describes a configuration including a selective catalytic reduction (SCR) catalyst, an adding valve that adds urea water to exhaust gas flowing into the SCR catalyst, and a low pressure EGR (exhaust gas recirculation) system that guides a part of the exhaust gas (EGR gas) from an exhaust passage at a downstream side of the SCR catalyst to an intake passage.

Patent Document 2 describes a configuration of a spark ignition internal combustion engine including an apparatus that supplies ammonia to an intake passage and an SCR catalyst arranged in an exhaust passage.

PRIOR ART REFERENCES

Patent Documents

Patent Document 1: WO 2012/164713
Patent Document 2: Japanese Patent Application Laid-open No. 2010-159705

SUMMARY OF THE INVENTION

Problems to be Solved by the Invention

As a technique for detecting an abnormality of an exhaust gas purification apparatus including an SCR catalyst and the like, a technique is known in which an abnormality of the exhaust gas purification apparatus is detected using an amount of $NO_x$ that flows into the SCR catalyst (hereinafter, referred to as a "$NO_x$ inflow amount") as a parameter. For example, a method is known in which a $NO_x$ purification ratio (a proportion of an amount of $NO_x$ purified by the SCR catalyst with respect to a $NO_x$ inflow amount) of the SCR catalyst is calculated using the $NO_x$ inflow amount as a parameter and an abnormality of an exhaust gas purification apparatus is diagnosed based on the calculation result.

In this case, when calculating a $NO_x$ purification ratio of the SCR catalyst, a $NO_x$ inflow amount and an amount of $NO_x$ that flows out from the SCR catalyst (hereinafter, referred to as a "$NO_x$ outflow amount") are required. While the $NO_x$ inflow amount and the $NO_x$ outflow amount may be calculated based on measurement values of a $NO_x$ sensor, since two $NO_x$ sensors are required, mountability on vehicle may decline or manufacturing cost may increase. In consideration thereof, a method is proposed in which only a $NO_x$ outflow amount is calculated using a $NO_x$ sensor and a $NO_x$ inflow amount is estimated (calculated) based on an operating state of an internal combustion engine.

In a vehicle mounted with a low pressure EGR system as described in Patent Document 1, an ammonia precursor such as urea water or ammonia may be introduced into the internal combustion engine by the low pressure EGR system. When an ammonia precursor or ammonia is burned in the internal combustion engine, $NO_x$ such as nitrogen monoxide (NO) is created. As a result, an amount of $NO_x$ that is actually discharged from the internal combustion engine or, in other words, an amount of $NO_x$ that actually flows into the SCR catalyst increases. In such a case, a $NO_x$ inflow amount calculated based on an operating state of the internal combustion engine is smaller than an actual $NO_x$ inflow amount. On the other hand, a $NO_x$ outflow amount calculated based on a measurement value of a $NO_x$ sensor may possibly increase significantly as the actual $NO_x$ inflow amount increases. Therefore, there is a possibility that a $NO_x$ purification ratio calculated based on a calculated value of the $NO_x$ inflow amount and on the $NO_x$ outflow amount may be smaller than an actual $NO_x$ purification ratio and an incorrect diagnosis may be made that an abnormality of the exhaust gas purification apparatus has occurred even though an abnormality of the exhaust gas purification apparatus has not occurred.

In addition, in a configuration in which both a $NO_x$ inflow amount and a $NO_x$ outflow amount are calculated based on measurement values of a $NO_x$ sensor, when the $NO_x$ inflow amount increases due to recirculation of an additive, a difference between a $NO_x$ purification ratio when an abnormality has not occurred and a $NO_x$ purification ratio when an abnormality has occurred decreases. In this case, when the measurement values of the $NO_x$ sensor include an error, there is a possibility that the $NO_x$ purification ratio when an abnormality has not occurred and the $NO_x$ purification ratio when an abnormality has occurred become indistinguishable from each other. Therefore, the possibility of an incorrect diagnosis increases that an abnormality of the exhaust gas purification apparatus has occurred although the exhaust gas purification apparatus is normal.

Means for Solving the Problems

The present invention has been made in consideration of the various circumstances described above, and an object thereof is to prevent an incorrect diagnosis from being made that an abnormality of an exhaust gas purification apparatus has occurred even though an abnormality of the exhaust gas purification apparatus has not occurred in an abnormality diagnosis apparatus of an exhaust gas purification apparatus, the abnormality diagnosis apparatus including: an exhaust gas purification apparatus that includes a selective catalytic reduction catalyst; a supply apparatus that supplies an additive which is ammonia or an ammonia precursor to the exhaust gas purification apparatus; an EGR apparatus that guides a part of exhaust gas from an exhaust passage at a downstream side of a supply position of the additive to an intake passage; and diagnosing means that performs an abnormality diagnosis of the exhaust gas purification apparatus using a $NO_x$ inflow amount as a parameter.

Means for Solving the Problems

In order to solve the problems described above, the present invention provides an abnormality diagnosis apparatus of an exhaust gas purification apparatus including: an exhaust gas purification apparatus which is arranged in an exhaust passage of an internal combustion engine and which includes a selective catalytic reduction catalyst; a supply apparatus which supplies an additive that is ammonia or an ammonia precursor to the exhaust gas purification apparatus; an EGR apparatus which recirculates a part of exhaust gas from the exhaust passage at a downstream side of a position of supplying the additive by the supply apparatus to an intake passage; obtaining means for obtaining an amount of $NO_x$ that flows into the exhaust gas purification apparatus; and diagnosing means for calculating a physical quantity correlated to a $NO_x$ purification performance of the exhaust gas purification apparatus in use of a $NO_x$ inflow amount obtained by the obtaining means as a parameter and for diagnosing that an abnormality has occurred in the exhaust gas purification apparatus when a calculation result thereof is smaller than a threshold, wherein when the additive is recirculated together with a part of the exhaust gas by the EGR apparatus, a value of the threshold is set smaller than when the additive is not recirculated together with a part of the exhaust gas by the EGR apparatus.

Specifically, an abnormality diagnosis apparatus of an exhaust gas purification apparatus according to the present invention includes:

an exhaust gas purification apparatus which is arranged in an exhaust passage of an internal combustion engine and which includes a selective catalytic reduction catalyst;

a supply apparatus which supplies an additive that is ammonia or an ammonia precursor to the exhaust gas purification apparatus;

an EGR apparatus which recirculates a part of exhaust gas from the exhaust passage at a downstream side of a position of supplying the additive by the supply apparatus to an intake passage;

obtaining means for obtaining a $NO_x$ inflow amount that is an amount of $NO_x$ that flows into the exhaust gas purification apparatus;

diagnosing means for calculating a physical quantity correlated to a $NO_x$ purification performance of the exhaust gas purification apparatus in use of the $NO_x$ inflow amount obtained by the obtaining means as a parameter and for diagnosing that an abnormality has occurred in the exhaust gas purification apparatus when a calculation result thereof is smaller than a threshold; and correcting means for, when the additive is recirculated together with a part of the exhaust gas by the EGR apparatus, correcting the threshold to a smaller value than when the additive is not recirculated together with a part of the exhaust gas by the EGR apparatus.

Conceivable indicators that represent a $NO_x$ purification performance of an exhaust gas purification apparatus include physical quantities such as a $NO_x$ purification ratio (a proportion of an amount of $NO_x$ purified by the exhaust gas purification apparatus with respect to an amount of $NO_x$ having flowed into the exhaust gas purification apparatus) and a $NO_x$ purification amount (an amount of $NO_x$ purified by the exhaust gas purification apparatus). Therefore, when diagnosing an abnormality of an exhaust gas purification apparatus using a $NO_x$ inflow amount as a parameter, a method is used in which a physical quantity such as that described above is calculated using a $NO_x$ inflow amount as a parameter and a calculation result thereof is compared with a threshold.

When a part of exhaust gas (EGR gas) is recirculated by an EGR apparatus, a part of an additive supplied from a supply apparatus may be recirculated together with the EGR gas. In such a case, the additive is burned together with an air-fuel mixture in an internal combustion engine. When an additive is burned, ammonia oxidizes and $NO_x$ such as nitrogen monoxide is created. Therefore, when a part of the additive is recirculated together with the EGR gas, an amount of $NO_x$ flowing out from the internal combustion engine (in other words, an amount of $NO_x$ that flows into the exhaust gas purification apparatus) increases as compared to when a part of the additive is not recirculated together with the EGR gas.

When a $NO_x$ inflow amount used in an abnormality diagnosing process of an exhaust gas purification apparatus is calculated using a parameter indicating an operating state of an internal combustion engine (for example, an intake air amount, a fuel injection amount, a fuel injection timing, and an engine rotational speed), a calculated value thereof (hereinafter, referred to as a "$NO_x$ inflow amount calculated value") is smaller than a $NO_x$ inflow amount in reality (hereinafter, referred to as an "actual $NO_x$ inflow amount").

As a result, when a physical quantity such as described above is calculated using a $NO_x$ inflow amount calculated value that is calculated by the obtaining means as a parameter, a correlation between a calculation result thereof and a $NO_x$ purification performance of the exhaust gas purification apparatus declines. For example, when a $NO_x$ purification ratio is used as an indicator representing a $NO_x$ purification performance of an exhaust gas purification apparatus, a $NO_x$ purification ratio calculated using a $NO_x$ inflow amount calculated value as a parameter may possibly be smaller than an actual $NO_x$ purification ratio. In addition, when a $NO_x$ purification amount is used as an indicator representing a $NO_x$ purification performance of an exhaust gas purification apparatus, a $NO_x$ purification amount calculated using a $NO_x$ inflow amount calculated value as a parameter may possibly be smaller than an actual $NO_x$ purification amount. Therefore, when an abnormality diagnosing process using a $NO_x$ inflow amount calculated value is performed while an additive is being recirculated together with EGR gas by an EGR apparatus, there is a possibility of an incorrect diagnosis that an abnormality of the exhaust gas purification apparatus has occurred being made even though an abnormality of the exhaust gas purification apparatus has not occurred.

Furthermore, in a configuration in which a $NO_x$ purification amount used in an abnormality diagnosing process of an exhaust gas purification apparatus is calculated based on a measurement value of a $NO_x$ sensor (in other words, a configuration in which an actual $NO_x$ inflow amount is obtained), when the $NO_x$ inflow amount increases due to an additive being recirculated together with EGR gas, indicators (physical quantities) such as those described earlier also increase. Such a phenomenon may also be exhibited when an abnormality has occurred in the exhaust gas purification apparatus. Therefore, when the actual $NO_x$ inflow amount increases due to the additive being recirculated together with EGR gas, a difference between an indicator (physical quantity) when an abnormality of the exhaust gas purification apparatus has not occurred and the indicator (physical quantity) when an abnormality of the exhaust gas purification apparatus has occurred decreases. In this case, when a measurement error of a $NO_x$ sensor is taken into consideration, the difference between the indicator (physical quantity) when an abnormality of the exhaust gas purification apparatus has not occurred and the indicator (physical quantity) when an abnormality of the exhaust gas purification apparatus has occurred becomes even smaller. As a result, a $NO_x$ purification ratio or a $NO_x$ purification amount may become smaller than a threshold even though an abnormality of the exhaust gas purification apparatus has not occurred. In other words, there is a possibility of an incorrect diagnosis that an abnormality of the exhaust gas purification apparatus has occurred being made even though an abnormality of the exhaust gas purification apparatus has not occurred.

In contrast, with the abnormality diagnosis apparatus of an exhaust gas purification apparatus according to the present invention, when the additive is recirculated together with EGR gas, a magnitude of the threshold is set smaller than when the additive is not recirculated together with the EGR gas. According to such a configuration, when an actual $NO_x$ inflow amount increases due to the additive being recirculated together with EGR gas, a situation is less likely to occur where the physical quantity becomes smaller than the threshold even when an abnormality of the exhaust gas purification apparatus has not occurred. In other words, an incorrect diagnosis that an abnormality of the exhaust gas purification apparatus has occurred even though an abnormality of the exhaust gas purification apparatus has not occurred is less likely to be made. As a result, a decline in diagnostic accuracy due to the additive being recirculated together with EGR gas can be suppressed.

Moreover, the threshold when the additive is being recirculated together with EGR gas may be set to a smaller value as an amount of the additive recirculated by the EGR apparatus increases. In a configuration in which the obtaining means obtains a $NO_x$ inflow amount calculated value, the larger the amount of the additive recirculated together with EGR gas, the larger a difference between the $NO_x$ inflow amount calculated value and the actual $NO_x$ inflow amount. Accordingly, the physical quantity calculated using the $NO_x$ inflow amount calculated value as a parameter decreases. Therefore, by setting the threshold to a smaller value as an amount of the additive recirculated together with the EGR gas increases, the physical quantity can be more reliably prevented from becoming smaller than the threshold even though an abnormality of the exhaust gas purification apparatus has not occurred.

On the other hand, in a configuration in which the obtaining means obtains an actual $NO_x$ inflow amount using a measurement value of a $NO_x$ sensor, the larger the amount of the additive to be recirculated together with EGR gas, the larger a calculated value of the $NO_x$ purification ratio may become. This tendency is also exhibited when an abnormality of the exhaust gas purification apparatus has occurred. Therefore, there is a possibility that the difference between the physical quantity when an abnormality of the exhaust gas purification apparatus has not occurred and physical quantity when an abnormality of the exhaust gas purification apparatus has occurred may decrease. In this case, when a measurement value of the $NO_x$ sensor that is used in a calculation of the physical quantity contains a measurement error, the physical quantity may fall below the threshold even when an abnormality of the exhaust gas purification apparatus has not occurred. In contrast, when the threshold is set to a smaller value as an amount of the additive recirculated together with the EGR gas increases, the physical quantity is less like to become smaller than the threshold even though an abnormality of the exhaust gas purification apparatus has not occurred.

Therefore, in a configuration in which the value of the threshold is set smaller as the amount of the additive that is recirculated together with EGR gas increases, an incorrect diagnosis that an abnormality of the exhaust gas purification apparatus has occurred can be more reliably prevented from being made even though an abnormality of the exhaust gas purification apparatus has not occurred.

When the threshold is corrected to a small value, there is a concern that the physical quantity may equal or exceed the threshold even when a $NO_x$ purification performance of the exhaust gas purification apparatus has declined. On the other hand, when EGR gas is being recirculated by the EGR apparatus, an amount of $NO_x$ that is discharged into the atmosphere decreases as compared to when EGR gas is not being recirculated. For example, in a configuration in which EGR gas is extracted from an exhaust passage on a downstream side of the exhaust gas purification apparatus, when the EGR gas is being recirculated, a part of $NO_x$ discharged from the exhaust gas purification apparatus is recirculated together with the EGR gas. Therefore, among the $NO_x$ having flowed out from the exhaust gas purification apparatus, an amount of $NO_x$ discharged into the atmosphere decreases as an amount of EGR gas increases. In addition, an amount of the additive that is recirculated together with EGR gas tends to increase as the amount of EGR gas increases. Therefore, in a configuration in which the threshold is changed in accordance with the amount of the additive that is recirculated together with EGR gas, since the threshold is changed to a smaller value as the amount of EGR gas increases, an amount of $NO_x$ discharged into the atmosphere is prevented from becoming excessive. Furthermore, in a configuration in which the threshold is changed in accordance with the amount of the additive that is recirculated together with EGR gas, a threshold is desirably set so that the amount of $NO_x$ discharged into the atmosphere does not exceed a regulatory value set by regulations or the like. In other words, a minimum value that the physical quantity may take when the amount of $NO_x$ discharged into the atmosphere equals or falls below a target value set in advance may be set as the threshold. By setting the threshold in this manner, when the $NO_x$ purification performance of the exhaust gas purification apparatus deteriorates to a level where the amount of $NO_x$ discharged into the atmosphere exceeds the regulatory value, a diagnosis that an abnormality has occurred in the exhaust gas purification apparatus can be made.

With a configuration in which the EGR apparatus recirculates EGR gas from an exhaust passage on a downstream side of the exhaust gas purification apparatus to an intake passage, an amount of the additive that is recirculated together with the EGR gas can be calculated using an amount of the additive that slips through the exhaust gas purification apparatus (hereinafter, referred to as a "slip amount") and a proportion of exhaust gas recirculated by the EGR apparatus with respect to an amount of exhaust gas discharged from the exhaust gas purification apparatus (corresponding to an EGR ratio) as parameters. In consideration thereof, the correcting means may calculate a recirculation amount of the additive using the parameters described above and correct the threshold in accordance with a calculation result thereof.

Moreover, in a case where a part of the additive slips through the exhaust gas purification apparatus, a recirculation amount of the additive tends to increase as the amount of the EGR gas or the EGR ratio increases. Therefore, the correcting means may correct the threshold in accordance with the amount of the EGR gas or the EGR ratio. Specifically, the correcting means may correct the threshold to a smaller value as the amount of the EGR gas or the EGR ratio increases when a slip amount of the additive is larger than a prescribed amount. In this case, a "prescribed amount" refers to a maximum slip amount (or an amount obtained by subtracting a margin from the maximum slip amount) at which accuracy of an abnormality diagnosing process can conceivably be maintained without correcting the threshold.

In this case, the slip amount of the additive can be obtained by using a temperature of the exhaust gas purification apparatus, a flow rate of exhaust gas flowing through the exhaust gas purification apparatus, and an amount of ammonia adsorbed by a selective catalytic reduction catalyst of the exhaust gas purification apparatus as parameters. For example, the slip amount of the additive when a temperature of the selective catalytic reduction catalyst is high is larger than when the temperature of the selective catalytic reduction catalyst is low. The slip amount of the additive when the flow rate of exhaust gas flowing through the selective catalytic reduction catalyst is large is larger than when the flow rate of exhaust gas flowing through the selective catalytic reduction catalyst is small. The slip amount of the additive when the amount of ammonia adsorbed by the selective catalytic reduction catalyst is large is larger than when the amount of ammonia adsorbed by the selective catalytic reduction catalyst is small. In consideration thereof, based on these tendencies, a map or a function representing a relationship among the temperature of the selective catalytic reduction catalyst, the flow rate of exhaust gas flowing through the selective catalytic reduction catalyst, the amount of ammonia adsorbed by the selective catalytic reduction catalyst, and the slip amount of the additive may be obtained in advance and the slip amount of the additive may be obtained based on the map or the function.

Next, in a configuration in which EGR gas is extracted from an exhaust passage between a supply position of the additive and the exhaust gas purification apparatus, a recirculation amount of the additive can be calculated using an amount of the additive supplied from the supply apparatus and an EGR ratio as parameters. In consideration thereof, the correcting means may calculate a recirculation amount of the additive using the parameters described above and correct the threshold in accordance with a calculation result thereof.

Moreover, in a case where the additive is supplied from the supply apparatus, a recirculation amount of the additive tends to increase as the amount of the EGR gas or the EGR ratio increases. Therefore, the correcting means may correct the threshold in accordance with the EGR gas or the EGR ratio. Specifically, the correcting means may correct the threshold to a smaller value as the amount of the EGR gas or the EGR ratio increases when an amount (supply amount) of the additive that is supplied from the supply apparatus is larger than a prescribed amount. In this case, a "prescribed amount" refers to a maximum supply amount (or an amount obtained by subtracting a margin from the maximum supply amount) at which accuracy of an abnormality diagnosing process can conceivably be maintained without correcting the threshold.

Effect of the Invention

According to the present invention, with an abnormality diagnosis apparatus of an exhaust gas purification apparatus, the abnormality diagnosis apparatus including: an exhaust gas purification apparatus that includes a selective catalytic reduction catalyst; a supply apparatus that supplies an additive which is ammonia or an ammonia precursor to the exhaust gas purification apparatus; an EGR apparatus that guides a part of exhaust gas from an exhaust passage on a downstream side of a supply position of the additive to an intake passage; and diagnosing means that performs an abnormality diagnosis of the exhaust gas purification apparatus using a $NO_x$ inflow amount that is an amount of $NO_x$ that flows into the exhaust gas purification apparatus as a parameter, an incorrect diagnosis that an abnormality of an exhaust gas purification apparatus has occurred even though an abnormality of the exhaust gas purification apparatus has not occurred can be prevented from being made.

MODES FOR CARRYING OUT THE INVENTION

Hereinafter, a specific embodiment of the present invention will be described with reference to the drawings. It is to be understood that dimensions, materials, shapes, relative arrangements, and the like of components described in the present embodiment are not intended to limit the technical scope of the invention thereto unless otherwise noted.

Figure 1:
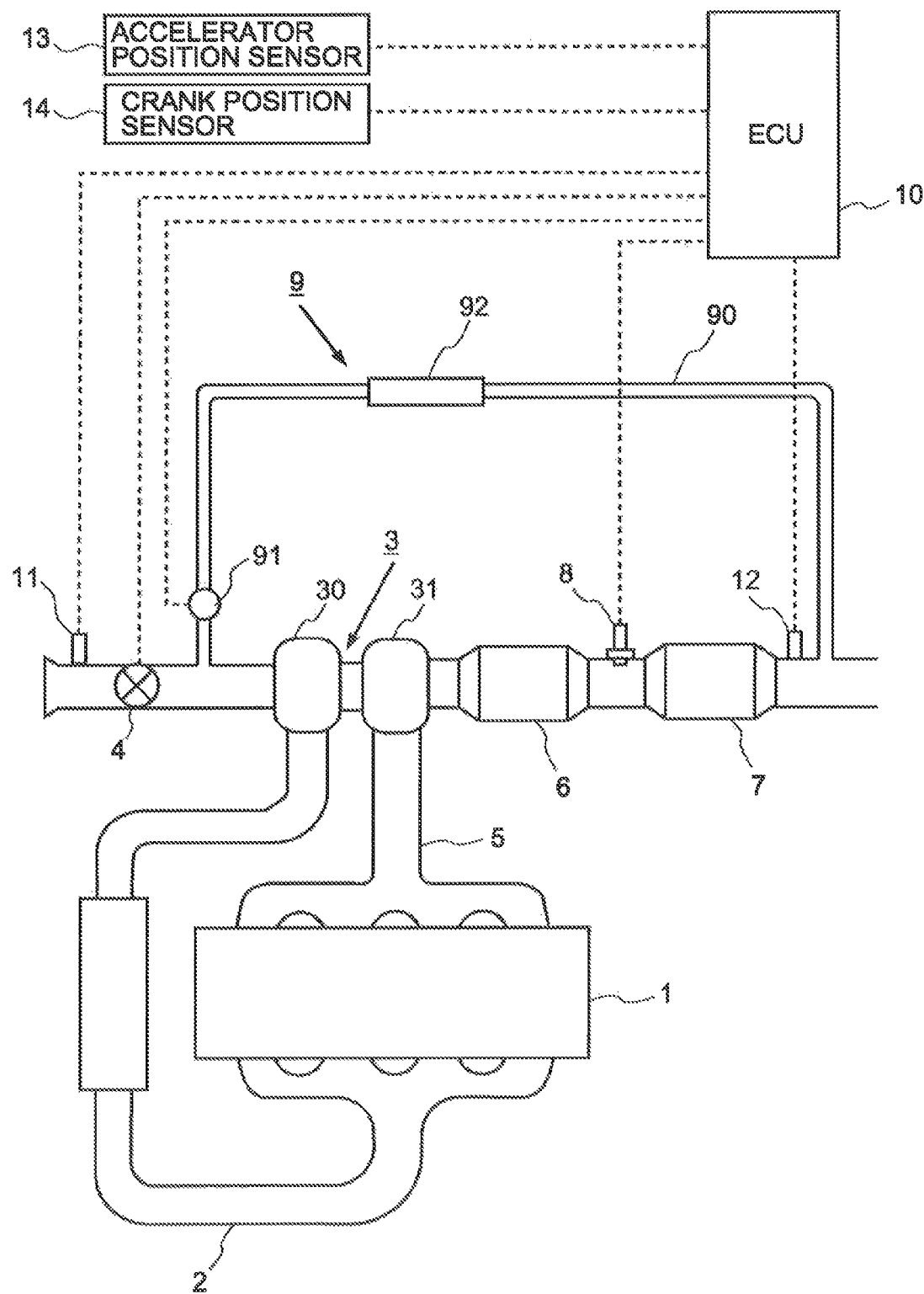
FIG. 1 is a diagram showing a schematic configuration of an internal combustion engine and an intake and exhaust system thereof to which the present invention is applied.

FIG. 1 is a diagram showing a schematic configuration of an internal combustion engine and an intake and exhaust system thereof to which the present invention is applied. An internal combustion engine 1 illustrated in FIG. 1 is a compression ignition internal combustion engine (diesel engine) that uses light oil as a main fuel or a spark ignition internal combustion engine (gasoline engine) that uses gasoline as a main fuel.

An intake passage 2 is connected to the internal combustion engine 1. The intake passage 2 is a passage for guiding fresh air (air) taken in from the atmosphere to the internal combustion engine 1. A compressor 30 of a centrifugal supercharger (turbocharger) 3 is arranged at an intermediate part of the intake passage 2. An intake throttle valve 4 that changes a passage sectional area of the intake passage 2 is arranged in the intake passage 2 at an upstream side of the compressor 30.

An exhaust passage 5 is connected to the internal combustion engine 1. The exhaust passage 5 is a passage for guiding gas (exhaust gas) burned inside a cylinder of the internal combustion engine 1 to an exhaust gas purification apparatus (to be described later) or to a silencer (not shown). A turbine 31 of the turbocharger 3 is arranged at an intermediate part of the exhaust passage 5. A first catalyst casing 6 is arranged in the exhaust passage 5 at a downstream side of the turbine 31.

The first catalyst casing 6 houses a particulate filter, an oxidation catalyst, and the like inside a cylindrical casing. Moreover, the first catalyst casing 6 may house a three-way catalyst or a storage reduction catalyst instead of the oxidation catalyst. In this case, the three-way catalyst or the storage reduction catalyst may be carried on the particulate filter.

A second catalyst casing 7 is arranged in the exhaust passage 5 at a downstream side of the first catalyst casing 6. The second catalyst casing 7 houses a selective catalytic reduction catalyst (SCR catalyst), an oxidation catalyst, or the like inside a cylindrical casing. Moreover, the second catalyst casing 7 may house a particulate filter carrying an SCR catalyst. In this case, the first catalyst casing 6 may house an oxidation catalyst or, alternatively, the oxidation catalyst may be housed inside the second catalyst casing 7 without providing the first catalyst casing 6. The second catalyst casing 7 configured in this manner corresponds to the exhaust gas purification apparatus according to the present invention.

An adding valve 8 is attached to the exhaust passage 5 between the first catalyst casing 6 and the second catalyst casing 7. The adding valve 8 is an injection valve for injecting an additive that is ammonia or an ammonia precursor into the exhaust passage 5. In this case, an aqueous solution of urea, ammonium carbamate, or the like can be used as the ammonia precursor. In the present embodiment, it is assumed that a urea aqueous solution is used as the additive injected by the adding valve 8. The adding valve 8 corresponds to the supply apparatus according to the present invention. Moreover, when the first catalyst casing 6 houses a three-way catalyst or an storage reduction catalyst, by making exhaust gas that flows into the first catalyst casing 6 a rich atmosphere, ammonia can also be created at the three-way catalyst or the storage reduction catalyst.

The urea aqueous solution injected from the adding valve 8 into the exhaust passage 5 flows into the second catalyst casing 7 together with exhaust gas. On this On occasion, the urea aqueous solution is pyrolyzed by the heat of the exhaust gas or hydrolyzed by the SCR catalyst. When the urea aqueous solution is pyrolyzed or hydrolyzed, ammonia is created. Ammonia created in this manner is adsorbed or stored in the SCR catalyst. The ammonia adsorbed or stored in the SCR catalyst reacts with $NO_x$ contained in the exhaust gas, creating nitrogen and water. In other words, ammonia functions as a reducing agent of $NO_x$.

Next, a base end of an EGR passage 90 is connected to the exhaust passage 5 at a downstream side of the second catalyst casing 7. A terminal end of the EGR passage 90 is connected to the intake passage 2 at a downstream side of the intake throttle valve 4 and at an upstream side of the compressor 30. The EGR passage 90 is a passage for guiding a part of exhaust gas (EGR gas) from the exhaust passage 5 to the intake passage 2.

An EGR valve 91 and an EGR cooler 92 are arranged at an intermediate part of the EGR passage 90. The EGR valve 91 is a valve mechanism which changes a passage sectional area of the EGR passage 90 and which adjusts an EGR gas amount that flows through the EGR passage 90. The EGR cooler 92 is a device that cools EGR gas flowing through the EGR passage 90 and may be, for example, a heat exchanger that causes heat to be exchanged between cooling water or outside air and the EGR gas. Moreover, the EGR passage 90, the EGR valve 91, and the EGR cooler 92 constitute an EGR apparatus 9.

An ECU 10 is annexed to the internal combustion engine 1 configured as described above. The ECU 10 is an electronic control unit constituted by a CPU, a ROM, a RAM, a backup RAM, and the like. The ECU 10 is electrically connected to various sensors including an air flow meter 11, a $NO_x$ sensor 12, an accelerator position sensor 13, and a crank position sensor 14.

The air flow meter 11 is arranged in the intake passage 2 at an upstream side of the intake throttle valve 4 and outputs an electric signal correlated to an amount (mass) of air that flows through the intake passage 2. The $NO_x$ sensor 12 is attached to the exhaust passage 5 at a downstream side of the second catalyst casing 7 and outputs an electric signal correlated to a $NO_x$ concentration in exhaust gas that flows out from the second catalyst casing 7. The accelerator position sensor 13 outputs an electric signal correlated to an operation amount (accelerator depression amount) of an accelerator pedal (not shown). The crank position sensor 14 outputs an electric signal correlated to a rotational position of an output shaft (crankshaft) of the internal combustion engine 1.

Furthermore, in addition to the intake throttle valve 4, the adding valve 8, and the EGR valve 91 described above, the ECU 10 is electrically connected to various devices such as a fuel injection valve (not shown). The ECU 10 electrically controls the various devices described above based on output signals of the various sensors described above.

For example, the ECU 10 calculates an engine load or an engine rotational speed based on output signals from the accelerator position sensor 13 and the crank position sensor 14 and controls a fuel injection amount or a fuel injection timing in accordance with a calculation result thereof. In addition, the ECU 10 diagnoses an abnormality of the SCR catalyst using an amount of $NO_x$ that flows into the SCR catalyst ($NO_x$ inflow amount) housed in the second catalyst casing 7 as a parameter.

An abnormality diagnosing method of the SCR catalyst will now be described. First, the ECU 10 calculates an amount of $NO_x$ discharged from the internal combustion engine 1 (in other words, an amount of $NO_x$ that flows into the SCR catalyst of the second catalyst casing 7 ($NO_x$ inflow amount)) based on a parameter indicating an operating state of the internal combustion engine 1.

The amount of $NO_x$ discharged from the internal combustion engine 1 is correlated with an amount of $NO_x$ generated when an air-fuel mixture is burned in the internal combustion engine 1. An amount of $NO_x$ generated when an air-fuel mixture is burned in the internal combustion engine 1 is correlated with an amount of oxygen contained in the air-fuel mixture, an amount of fuel contained in the air-fuel mixture, a fuel injection timing, and an engine rotational speed. The amount of oxygen contained in the air-fuel mixture is correlated with an intake air amount (an output signal of the air flow meter 11). The amount of fuel contained in the air-fuel mixture is correlated with a fuel injection amount. Therefore, the ECU 10 can calculate a $NO_x$ inflow amount using an output signal of the air flow meter 11, a fuel injection amount, a fuel injection timing, and an engine rotational speed as parameters. Moreover, relationships among the various parameters described above and a $NO_x$ inflow amount may be empirically obtained and stored in a ROM of the ECU 10 in advance in the form of a map or a functional expression. The obtaining means according to the present invention is realized as the ECU 10 calculates a $NO_x$ inflow amount as described above.

The ECU 10 calculates a physical quantity correlated to a $NO_x$ purification performance of the SCR catalyst using a calculated value of a $NO_x$ inflow amount ($NO_x$ inflow amount calculated value) as a parameter, and diagnoses an abnormality of the SCR catalyst based on a calculation result thereof. For example, while a $NO_x$ purification ratio of the SCR catalyst, a $NO_x$ purification amount of the SCR catalyst, or the like can be used as a physical quantity indicating a $NO_x$ purification performance of the SCR catalyst, hereinafter, an example in which a $NO_x$ purification ratio is used as the physical quantity correlated to the $NO_x$ purification performance of the SCR catalyst will be described. The $NO_x$ purification ratio in this case refers to a proportion of an amount of $NO_x$ purified by the SCR catalyst with respect to an amount of $NO_x$ that flows into the SCR catalyst. The $NO_x$ purification ratio can be calculated with Expression (1) below.

$$Enox = (Anoxin - Anoxout)/Anoxin \qquad (1)$$

In Expression (1) above, Enox denotes a $NO_x$ purification ratio. Anoxin denotes a $NO_x$ inflow amount into which the $NO_x$ inflow amount ($NO_x$ inflow amount calculated value) calculated by the method described above is to be substituted. Anoxout denotes a $NO_x$ outflow amount into which a value obtained by multiplying an output signal ($NO_x$ concentration) of the $NO_x$ sensor 12 with an exhaust flow rate per unit time (a sum of an intake air amount per unit time and a fuel injection amount per unit time) is to be substituted.

Once the $NO_x$ purification ratio Enox is calculated with Expression (1) above, the ECU 10 determines whether or not the $NO_x$ purification ratio Enox is equal to or higher than a threshold. The "threshold" in this case refers to a minimum $NO_x$ purification ratio or a value obtained by adding a margin to the minimum $NO_x$ purification ratio when an abnormality of the SCR catalyst has not occurred. The ECU 10 determines that an abnormality of the SCR catalyst has not occurred when the $NO_x$ purification ratio Enox is equal to or higher than the threshold. On the other hand, a determination that an abnormality of the SCR catalyst has occurred is made when the $NO_x$ purification ratio Enox is lower than the threshold. The diagnosing means according to the present invention is realized as the ECU 10 executes an abnormality diagnosis of the SCR catalyst as described above using a $NO_x$ inflow amount calculated value as a parameter.

When an abnormality diagnosis of the SCR catalyst is performed during recirculation of a part of exhaust gas to the intake passage 2 from the exhaust passage 5 by the EGR apparatus 9 or, more specifically, during a reflow of a part of exhaust gas (EGR gas) recirculated by the EGR apparatus 9 into the SCR catalyst, there is a possibility that an incorrect diagnosis will be made.

When a part of ammonia slips through the SCR catalyst as the EGR gas is being recirculated, a part of the ammonia is sucked into the internal combustion engine 1 together with the EGR gas. The ammonia sucked into the internal combustion engine 1 is burned together with an air-fuel mixture. In this case, since ammonia comes into contact with oxygen under a high temperature, the ammonia is oxidized and $NO_x$ such as nitrogen monoxide is created. As a result, when ammonia is sucked into the internal combustion engine 1 together with EGR gas, an amount of $NO_x$ discharged from the internal combustion engine 1 increases as compared to when ammonia is not sucked into the internal combustion engine 1.

Figure 2:
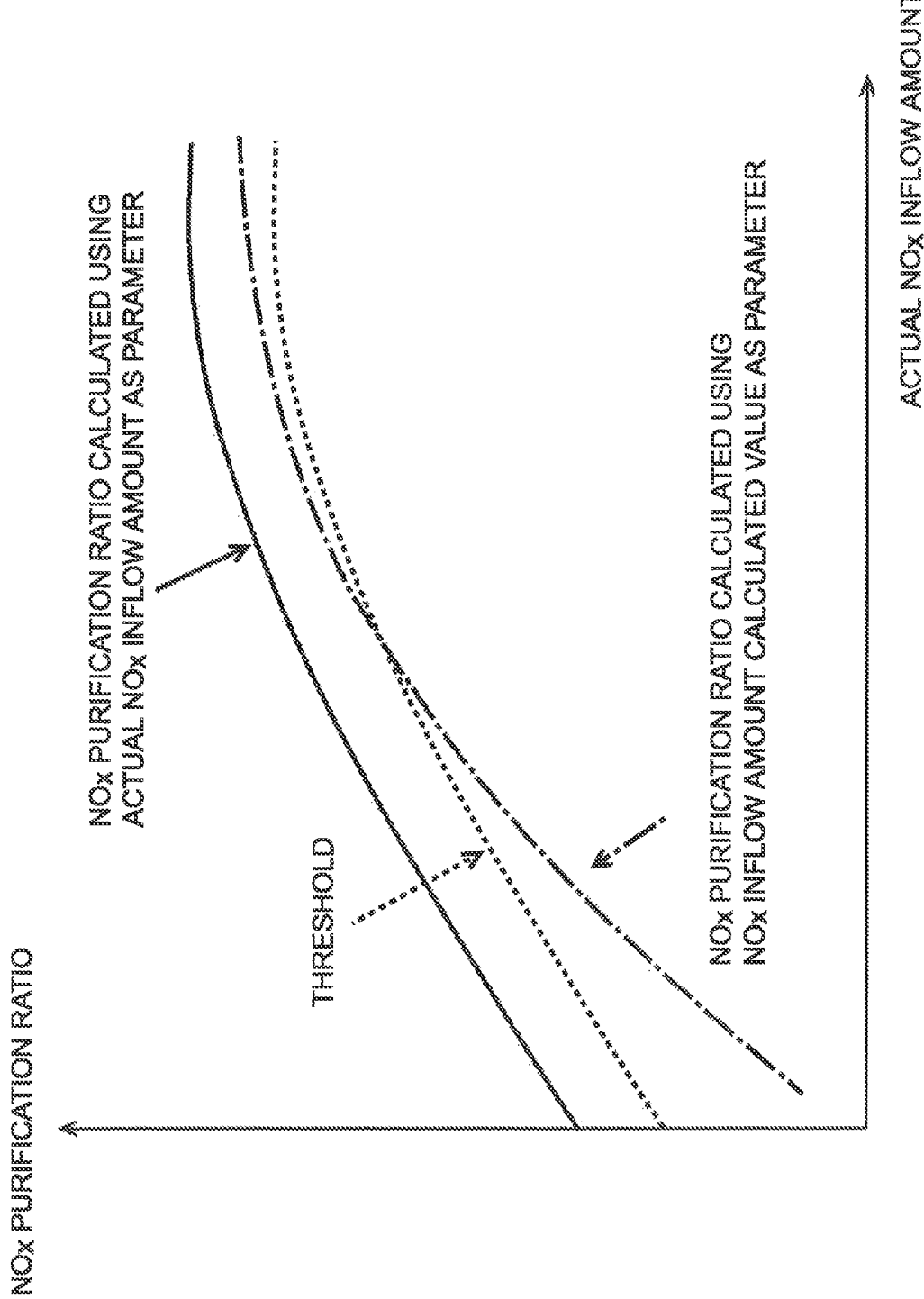
FIG. 2 is a diagram showing a relationship between a $NO_x$ inflow amount and a $NO_x$ purification ratio.

When the amount of $NO_x$ discharged from the internal combustion engine 1 increases due to the reason described above, an error occurs between a $NO_x$ inflow amount calculated value and an actual $NO_x$ inflow amount. In addition, when the actual $NO_x$ inflow amount increases, an amount of $NO_x$ not purified by the SCR catalyst increases and a $NO_x$ outflow amount calculated based an output signal of the $NO_x$ sensor 12 may increase. In particular, when an amount of a urea aqueous solution injected from the adding valve 8 is adjusted based on the $NO_x$ inflow amount calculated value, since the amount of urea aqueous solution injected from the adding valve 8 becomes smaller than an amount suitable for the actual $NO_x$ inflow amount, the $NO_x$ outflow amount increases. As a result, as shown in FIG. 2, even when an abnormality of the SCR catalyst has not occurred, the $NO_x$ purification ratio Enox as calculated with Expression (1) above may fall below the threshold. Moreover, a solid line in FIG. 2 indicates a $NO_x$ purification ratio as calculated using the actual $NO_x$ inflow amount as a parameter and an one-dot chain line in FIG. 2 indicates a $NO_x$ purification ratio as calculated using the $NO_x$ inflow amount calculated value as a parameter. In addition, a dotted line in FIG. 2 indicates the threshold.

In consideration thereof, the abnormality diagnosis apparatus according to the present embodiment is configured to correct the threshold to a smaller value in a case where EGR gas is being recirculated and ammonia is flowing out from the SCR catalyst as compared to a case where EGR gas is not being recirculated or ammonia is not flowing out from the SCR catalyst.

Figure 3:
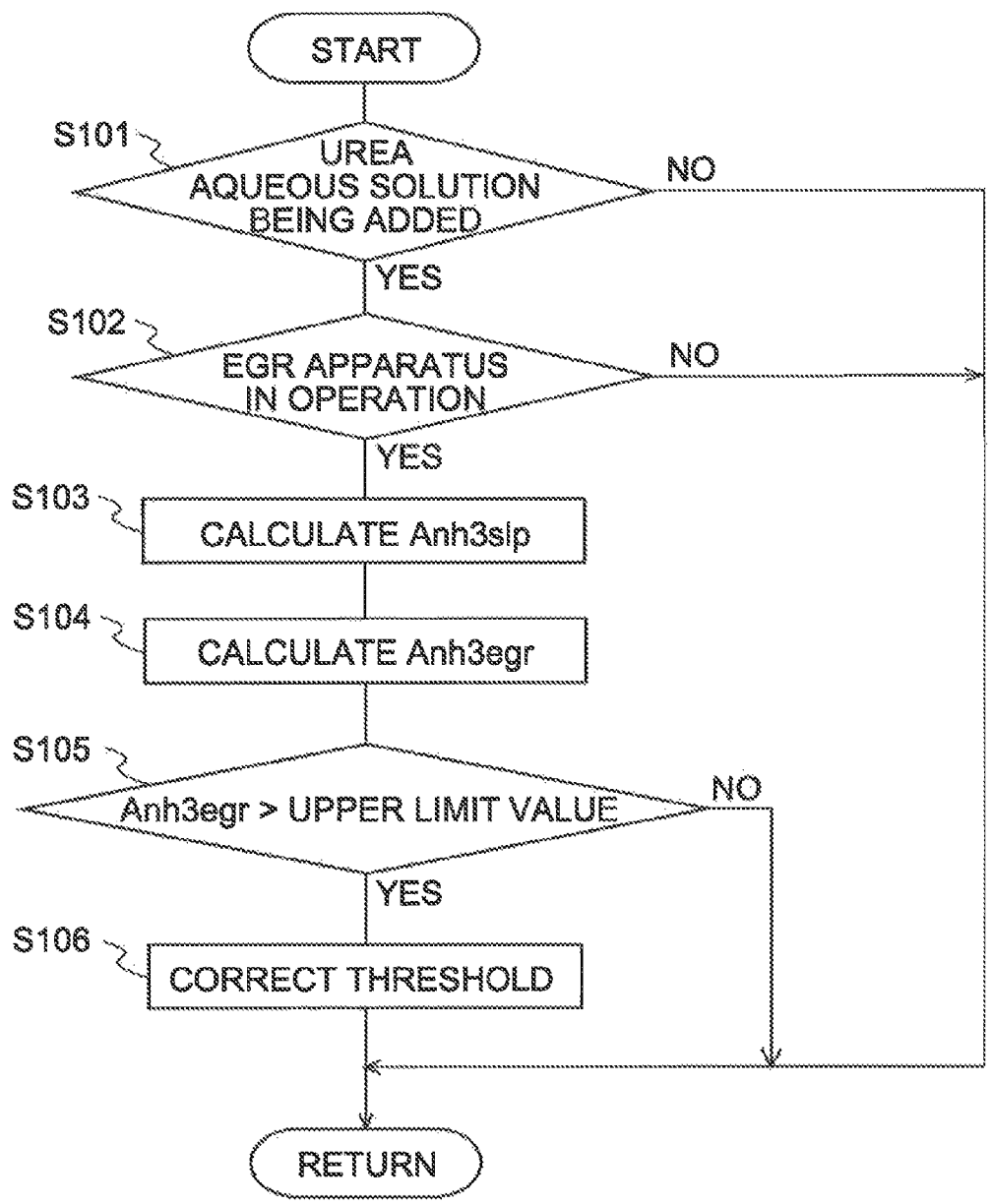
FIG. 3 is a flow chart showing a processing routine executed by an ECU when correcting a threshold used in an abnormality diagnosing process of an SCR catalyst.

Hereinafter, a procedure of correcting the threshold will be described with reference to FIG. 3. FIG. 3 is a flow chart showing a processing routine that is executed by the ECU 10 when correcting the threshold. This processing routine is stored in the ROM of the ECU 10 in advance and is periodically executed by the ECU 10 (CPU).

In the processing routine shown in FIG. 3, first, in a process of S101, the ECU 10 determines whether or not the adding valve 8 is injecting a urea aqueous solution. When a negative determination is made in the process of S101, since ammonia is not sucked into the internal combustion engine 1 together with EGR gas or since an amount of ammonia that is sucked into the internal combustion engine 1 together with EGR gas is small even when a part of ammonia adsorbed by the SCR catalyst is desorbed, the ECU 10 terminates execution of the present processing routine without correcting the threshold. On the other hand, when a positive determination is made in the process of S101, the ECU 10 proceeds to a process of S102.

In the process of S102, the ECU 10 determines whether or not the EGR apparatus 9 is operating or, in other words, whether or not a part of exhaust gas is being recirculated from the exhaust passage 5 to the intake passage 2 by the EGR apparatus 9. Specifically, the ECU 10 makes a negative determination when an opening amount of the EGR valve 91 is zero (fully closed) and makes a positive determination when the opening amount of the EGR valve 91 is larger than zero. When a negative determination is made in the process of S102, since ammonia having slipped through the SCR catalyst is not sucked into the internal combustion engine 1, a value of the threshold need not be corrected. Therefore, when a negative determination is made in the process of S102, the ECU 10 terminates execution of the present processing routine.

Moreover, when a negative determination is made in the process of S101 and when negative in the process of S102, the ECU 10 executes an abnormality diagnosing process of the exhaust gas purification apparatus using the uncorrected threshold.

When a positive determination is made in the process of S102, ammonia having slipped through the SCR catalyst may be sucked into the internal combustion engine 1. Therefore, the ECU 10 proceeds to a process of S103 and calculates an amount of ammonia (an ammonia slip amount) Anh3slp that flows out from the SCR catalyst. In this case, the ammonia slip amount Anh3slp is calculated using a flow rate of exhaust gas, a temperature of the SCR catalyst, and an ammonia adsorption amount of the SCR catalyst as parameters.

Figure 4:
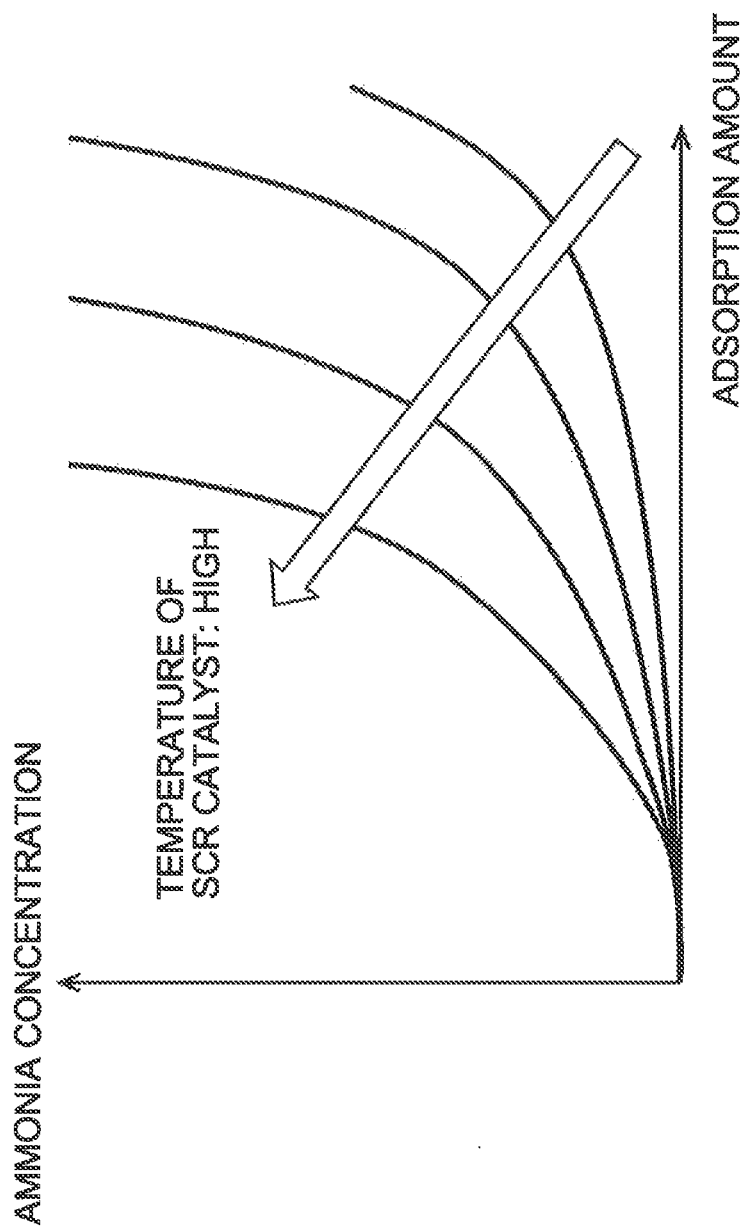
FIG. 4 is a diagram showing a relationship among an ammonia adsorption amount of an SCR catalyst, a temperature of the SCR catalyst, and a slip amount of ammonia.

FIG. 4 is a diagram showing a relationship among an amount (adsorption amount) of ammonia being adsorbed by an SCR catalyst, a temperature of the SCR catalyst, and an ammonia concentration of exhaust gas flowing out from the SCR catalyst in a case where a flow rate of exhaust gas passing through the SCR catalyst is constant. In FIG. 4, the ammonia concentration of exhaust gas flowing out from the SCR catalyst becomes higher as the ammonia adsorption amount by the SCR catalyst increases and becomes higher as the temperature of the SCR catalyst rises. Therefore, it could be said that, when the flow rate of exhaust gas passing through the SCR catalyst is constant, the ammonia slip amount increases as the ammonia adsorption amount by the SCR catalyst increases and increases as the temperature of the SCR catalyst rises.

In addition, when the ammonia concentration of exhaust gas flowing out from the SCR catalyst is constant, the larger the flow rate of exhaust gas passing through the SCR catalyst per unit time, the larger the slip amount per unit time. Therefore, the ammonia slip amount increases as the flow rate of exhaust gas passing through the SCR catalyst per unit time increases.

In consideration thereof, in the present embodiment, ammonia concentration of exhaust gas flowing out from the SCR catalyst is obtained based on a relationship such as that shown in FIG. 4, and the ammonia slip amount Anh3slp is obtained by multiplying the ammonia concentration by an exhaust flow rate per unit time (a sum of an intake air amount per unit time and a fuel injection amount per unit time).

Moreover, the ammonia adsorption amount used when obtaining the ammonia slip amount Anh3slp is estimated by an appropriate method. For example, the ammonia adsorption amount is obtained by subtracting an amount of ammonia consumed at the SCR catalyst (an amount of ammonia consumed to reduce $NO_x$) and a slip amount from an amount of ammonia flowing into the SCR catalyst.

Figure 5:
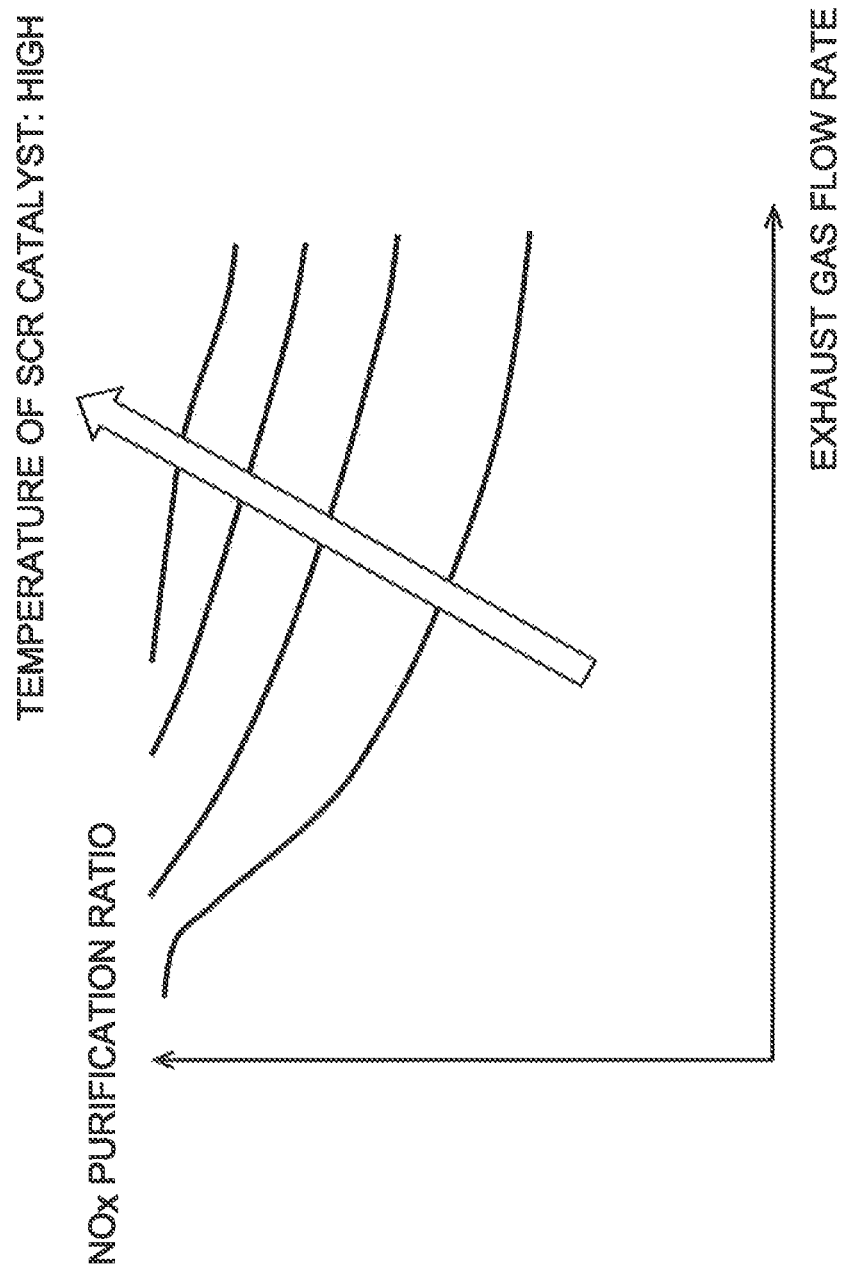
FIG. 5 is a diagram showing a relationship among a flow rate of exhaust gas that passes through an SCR catalyst, a temperature of the SCR catalyst, and a $NO_x$ purification ratio.

The amount of ammonia consumed at the SCR catalyst is calculated using a $NO_x$ inflow amount and a $NO_x$ purification ratio as parameters. The $NO_x$ inflow amount calculated value described earlier is used as the $NO_x$ inflow amount at this point. In addition, while the $NO_x$ purification ratio may be obtained by a similar method to the $NO_x$ purification ratio used in an abnormality diagnosing process of the exhaust gas purification apparatus, the $NO_x$ purification ratio may be estimated using a flow rate of exhaust gas flowing into the SCR catalyst (a sum of an intake air amount per unit time and a fuel injection amount per unit time) and a temperature of the SCR catalyst as parameters. For example, the $NO_x$ purification ratio used to calculate ammonia consumption may be estimated based on a relationship such as that shown in FIG. 5. FIG. 5 is a diagram showing a relationship among a flow rate of exhaust gas (a sum of an intake air amount per unit time and a fuel injection amount per unit time), a temperature of the SCR catalyst, and a $NO_x$ purification ratio. The $NO_x$ purification ratio tends to decrease as the exhaust flow rate increases and to increase as the temperature of the SCR catalyst rises (however, when the temperature of the SCR catalyst exceeds an upper limit temperature (for example, 350° C.), the $NO_x$ purification ratio decreases as the temperature of the SCR catalyst rises). Therefore, a map or a function defining a relationship such as that shown in FIG. 5 may be obtained in advance and the $NO_x$ purification ratio may be obtained based on the map or the function.

The calculating process of an ammonia adsorption amount described above is assumed to be started before the start of recirculation of EGR gas after startup of the internal combustion engine 1 and subsequently repetitively executed at a prescribed cycle. In addition, a value obtained in an immediately preceding calculating process (previous value) is assumed to be used as the ammonia adsorption amount used to calculate the ammonia slip amount Anh3slp.

In a process of S104, the ECU 10 calculates an amount (recirculation amount) Anh3egr of ammonia that is recirculated together with EGR gas using the ammonia slip amount Anh3slp calculated in the above-mentioned process of S103 as a parameter. Specifically, the ECU 10 calculates the ammonia recirculation amount Anh3egr using the ammonia slip amount Anh3slp and a proportion of an EGR gas amount with respect to an exhaust flow rate as parameters. Moreover, the proportion of the EGR gas amount with respect to the exhaust flow rate can be calculated using an EGR ratio and an output signal (intake air amount) of the air flow meter 11 as parameters.

In a process in S105, the ECU 10 determines whether or not the recirculation amount Anh3egr obtained in the process in S104 is equal to or larger than an upper limit amount. In this case, an "upper limit amount" refers to a maximum recirculation amount (or an amount obtained by subtracting a margin from the maximum recirculation amount) at which accuracy of an abnormality diagnosing process can conceivably be maintained without correcting the threshold. When a negative determination is made in the process of S105, the ECU 10 terminates execution of the present processing routine without correcting the threshold. On the other hand, when a positive determination is made in the process of S105, the ECU 10 proceeds to a process of S106.

In the process in S106, the ECU 10 corrects the threshold. In doing so, the ECU 10 corrects the threshold to a smaller value as the recirculation amount Anh3egr calculated in the process of S105 described above increases. In this case, a difference between a $NO_x$ inflow amount calculated value and an actual $NO_x$ inflow amount increases as the recirculation amount Anh3egr increases. In other words, a magnitude of the $NO_x$ inflow amount calculated value with respect to the actual $NO_x$ inflow amount decreases as the recirculation amount Anh3egr increases. Accordingly, a value of the $NO_x$ purification ratio calculated based on Expression (1) described above also decreases as the recirculation amount Anh3egr increases. Therefore, when the threshold is corrected to a smaller value as the recirculation amount Anh3egr increases, an incorrect diagnosis that an abnormality has occurred at the SCR catalyst even though an abnormality of the SCR catalyst has not occurred is less likely to be made. Moreover, a relationship between the threshold and the recirculation amount Anh3egr is to be obtained in advance by a conformity process using an experiment or the like. As described earlier, the ammonia recirculation amount Anh3egr tends to increase as EGR gas increases (as an EGR ratio increases). Therefore, when the ammonia slip amount Anh3slp is larger than a prescribed amount, the threshold may be corrected to a smaller value as the EGR gas amount increases or as the EGR ratio increases. In this case, a "prescribed amount" refers to a maximum slip amount (or an amount obtained by subtracting a margin from the maximum slip amount) at which accuracy of an abnormality diagnosing process can conceivably be maintained without correcting the threshold.

When the threshold is made smaller in accordance with a recirculation amount of ammonia, there is a concern that the $NO_x$ purification ratio may indicate a value equal to or higher than the threshold even though an abnormality has occurred at the SCR catalyst. However, when EGR gas is being recirculated, an amount of $NO_x$ that is discharged into the atmosphere decreases as compared to when EGR gas is not being recirculated. In other words, when EGR gas is being recirculated, a part of $NO_x$ having flowed out from the SCR catalyst is recirculated together with the EGR gas. Therefore, among the $NO_x$ having flowed out from the SCR catalyst, an amount of $NO_x$ discharged into the atmosphere decreases as an amount of EGR gas increases.

In consideration thereof, the abnormality diagnosis apparatus according to the present embodiment is configured to set, as the threshold, a $NO_x$ purification ratio when an amount of $NO_x$ discharged into the atmosphere equals a regulatory value set by regulations or the like in a case where the threshold is changed in accordance with a recirculation amount of ammonia. The threshold set by such a method takes a smaller value as the EGR gas amount increases (in other words, as the recirculation amount of ammonia increases). Therefore, in addition to preventing an incorrect diagnosis that an abnormality has occurred at the SCR catalyst even though an abnormality of the SCR catalyst has not occurred from being made, an incorrect diagnosis that an abnormality of the SCR catalyst has not occurred even though an abnormality has occurred at the SCR catalyst can be prevented from being made.

The correcting means according to the present invention is realized as the ECU 10 executes the processing routine shown in FIG. 3 as described above. As a result, even when an amount of ammonia sucked into the internal combustion engine 1 together with EGR gas is large enough to cause an incorrect diagnosis to be made, an occurrence of an incorrect diagnosis can be suppressed and an abnormality diagnosis of the SCR catalyst can be performed more accurately.

In addition, once an abnormality diagnosis of the SCR catalyst is performed accurately, an abnormality diagnosing process of a urea aqueous solution can also be executed more accurately. The "abnormality diagnosing process of a urea aqueous solution" in this case refers to a process for diagnosing whether or not a concentration of urea contained in the urea aqueous solution is lower than a lower limit value. When the concentration of urea contained in the urea aqueous solution becomes excessively low, an amount of ammonia supplied to the SCR catalyst may become excessively small and an amount of $NO_x$ that is not purified by the SCR catalyst may become excessively large. In addition, when feedback control of an injection amount of the urea aqueous solution is performed based on a difference between a $NO_x$ purification ratio of the SCR catalyst and a target value, the injection amount of the urea aqueous solution may become excessively large and consumption of the urea aqueous solution may become excessively large.

To address such problems, an abnormality of the urea aqueous solution is diagnosed using a $NO_x$ purification ratio when the injection amount of the urea aqueous solution is set larger than the target value as a parameter. For example, when the concentration of urea contained in the urea aqueous solution is equal to or higher than a lower limit value, a slip amount of ammonia increases. In this case, the $NO_x$ sensor 12 characteristically reacts to ammonia in addition to $NO_x$ in exhaust gas. Therefore, when the slip amount of ammonia increases, the output signal from the $NO_x$ sensor 12 also increases. When the output signal from the $NO_x$ sensor 12 increases, the $NO_x$ purification ratio Enox as obtained by Expression (1) above declines.

On the other hand, when the concentration of urea contained in the urea aqueous solution is lower than the lower limit value, the slip amount of ammonia hardly increases and an ammonia adsorption amount by the SCR catalyst increases. As a result, the output signal of the $NO_x$ sensor 12 either remains unchanged or decreases. Consequently, the $NO_x$ purification ratio Enox as obtained by Expression (1) above either hardly changes or increases.

Therefore, an abnormality of the urea aqueous solution can be more accurately diagnosed by executing an abnormality diagnosing process of the urea aqueous solution when a diagnosis that an abnormality of the SCR catalyst has not occurred is made in an abnormality diagnosing process of the SCR catalyst.

When an abnormality diagnosing process of the urea aqueous solution is executed by the method described above, since an amount of ammonia flowing out from the SCR catalyst increases when an abnormality of the urea aqueous solution has not occurred, there is a possibility that a relatively large amount of ammonia may be accordingly discharged into the atmosphere. In consideration thereof, the abnormality diagnosis apparatus according to the present embodiment is configured to operate the EGR apparatus 9 (open the EGR valve 91) when executing an abnormality diagnosing process of the urea aqueous solution in a non-operating state of the EGR apparatus 9 or to increase the EGR ratio when executing an abnormality diagnosing process of the urea aqueous solution in an operating state of the EGR apparatus 9. According to such a method, an abnormality diagnosing process of the urea aqueous solution can be executed while reducing an amount of ammonia that is discharged to the atmosphere.

Moreover, while an example of using a $NO_x$ inflow amount calculated value calculated based on parameters indicating an operating state of the internal combustion engine 1 as a $NO_x$ inflow amount to be used in an abnormality diagnosis of an SCR catalyst has been described in the present embodiment, alternatively, a $NO_x$ sensor may be arranged in the exhaust passage 5 between the first catalyst casing 6 and the second catalyst casing 7 and an actual $NO_x$ inflow amount may be calculated based on a measurement value of the $NO_x$ sensor (a $NO_x$ concentration in exhaust gas). With such a configuration, by setting a $NO_x$ purification ratio when an amount of $NO_x$ discharged into the atmosphere equals a regulatory value set by regulations or the like as a threshold, an incorrect diagnosis that an abnormality has occurred at the SCR catalyst even though an abnormality of the SCR catalyst has not occurred can be prevented from being made and, at the same time, an incorrect diagnosis that an abnormality of the SCR catalyst has not occurred even though an abnormality has occurred at the SCR catalyst can be prevented from being made.

Figure 6:
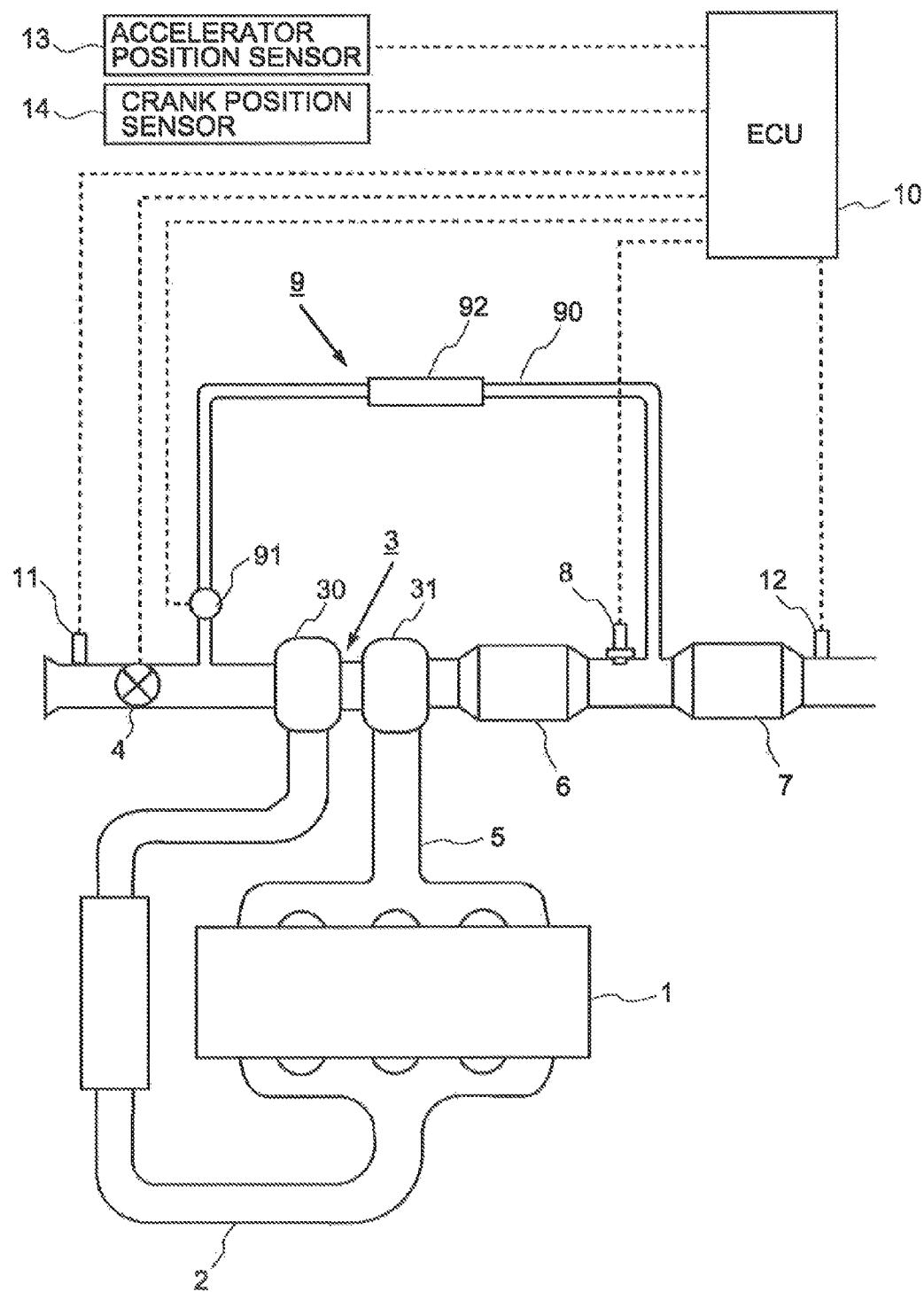
FIG. 6 is a diagram showing another configuration example of an internal combustion engine and an intake and exhaust system thereof to which the present invention is applied.

In addition, while an example in which a base end (upstream side end) of the EGR passage 90 is connected to the exhaust passage 5 on a downstream side of the second catalyst casing 7 has been described in the present embodiment, alternatively, the base end of the EGR passage 90 may be connected to the exhaust passage 5 between the adding valve 8 and the second catalyst casing 7 as shown in FIG. 6. In this case, the recirculation amount of ammonia may be calculated using an amount of urea aqueous solution injected from the adding valve 8 and a proportion of an EGR gas amount with respect to a flow rate of exhaust gas as parameters.

EXPLANATION OF REFERENCE NUMERALS AND CHARACTERS 1 internal combustion engine
2 intake passage
3 turbocharger
4 intake throttle valve
5 exhaust passage
6 first catalyst casing
7 second catalyst casing
8 adding valve
9 EGR apparatus
10 ECU
11 air flow meter
12 $NO_x$ sensor
30 compressor
31 turbine
90 EGR passage
91 EGR valve
92 EGR cooler

The invention claimed is:

1. An abnormality diagnosis apparatus of an exhaust gas purification apparatus, comprising:
   an exhaust gas purification apparatus which is arranged in an exhaust passage of an internal combustion engine and which includes a selective catalytic reduction catalyst;
   a supply apparatus which supplies an additive that is ammonia or an ammonia precursor to the exhaust gas purification apparatus;
   an EGR apparatus which recirculates a part of exhaust gas from the exhaust passage at a downstream side of a position of supplying the additive by the supply apparatus to an intake passage; and
   an electronic control unit comprising at least one processor configured to: obtain a NOx inflow amount that is an amount of NOx that flows into the exhaust gas purification apparatus;
   calculate a physical quantity correlated to a NOx purification performance of the exhaust gas purification apparatus using the obtained NOx inflow amount as a parameter, and diagnose that an abnormality has occurred in the exhaust gas purification apparatus when the calculated physical value is smaller than a threshold; and
   when the additive is recirculated together with a part of the exhaust gas by the EGR apparatus, correct the threshold to a smaller value than when the additive is not recirculated together with a part of the exhaust gas by the EGR apparatus.

2. The abnormality diagnosis apparatus of an exhaust gas purification apparatus according to claim 1, wherein the at least one processor is configured to obtain the $NO_x$ inflow amount by calculating the $NO_x$ inflow amount using a parameter indicating an operating state of the internal combustion engine.

3. The abnormality diagnosis apparatus of an exhaust gas purification apparatus according to claim 1, wherein the at least one processor is configured to obtain the $NO_x$ inflow amount using a $NO_x$ sensor arranged in the exhaust passage at an upstream side of the exhaust gas purification apparatus.

4. The abnormality diagnosis apparatus of an exhaust gas purification apparatus according to claim 2, wherein the at least one processor is configured to correct the threshold to a smaller value in a case where an amount of the additive that is recirculated together with a part of exhaust gas by the EGR apparatus is larger than when an amount of the additive that is recirculated together with a part of exhaust gas by the EGR apparatus is smaller.

5. The abnormality diagnosis apparatus of an exhaust gas purification apparatus according to claim 4, wherein
   the EGR apparatus is configured to recirculate a part of exhaust gas from the exhaust passage at a downstream side of the exhaust gas purification apparatus to the intake passage, and
   when an amount of $NO_x$ discharged from the exhaust passage into the atmosphere equals or falls below a target value set in advance, the at least one processor sets a possible minimum value of the physical quantity as the threshold.

* * * * *